United States Patent [19]

Bloomer

[11] Patent Number: 4,528,494
[45] Date of Patent: Jul. 9, 1985

[54] REVERSE-PHASE-CONTROL POWER SWITCHING CIRCUIT AND METHOD

[75] Inventor: Milton D. Bloomer, Schenectady, N.Y.

[73] Assignee: General Electric Company, Schenectady, N.Y.

[21] Appl. No.: 529,296

[22] Filed: Sep. 6, 1983

[51] Int. Cl.³ ............................................... G05F 1/44
[52] U.S. Cl. .................................... 323/237; 323/235; 323/323
[58] Field of Search ............... 323/235, 237–239, 323/241–244, 246, 270, 300, 319–326

[56] References Cited

U.S. PATENT DOCUMENTS

| | | | |
|---|---|---|---|
| 3,022,454 | 2/1962 | Millis | 323/270 X |
| 3,898,516 | 8/1975 | Nakasone | 323/238 X |
| 4,008,416 | 2/1977 | Nakasone | 323/321 X |
| 4,245,184 | 1/1981 | Billings et al. | 323/235 |

Primary Examiner—Peter S. Wong
Attorney, Agent, or Firm—Geoffrey H. Krauss; James C. Davis, Jr.; Marvin Snyder

[57] ABSTRACT

A reverse-phase-control power switching circuit provides for controlling the flow of current through a load, from an A.C. source, and includes circuitry for limiting the in-rush current for a load having a variation of resistance due to initial turn-on phenomenon. Load current is enabled to flow at each zero crossing of an A.C. source, connected in series with the load and the switching circuit of the present invention. Load current is terminated at a time, prior to the next source waveform zero crossing, to either maintain a substantially constant current conduction angle for a load with a substantially-constant steady-state resistance, or to limit load instantaneous current to a maximum level, set to a value somewhat greater than the desired normal load current, during low-load-resistance in-rush time intervals.

24 Claims, 5 Drawing Figures

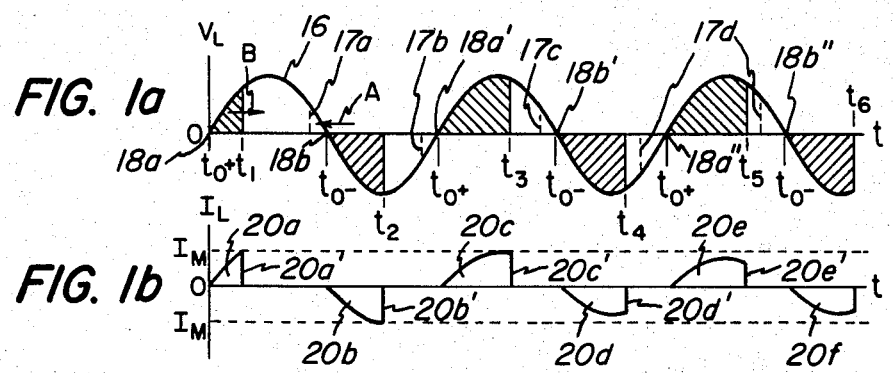
FIG. 1a
FIG. 1b
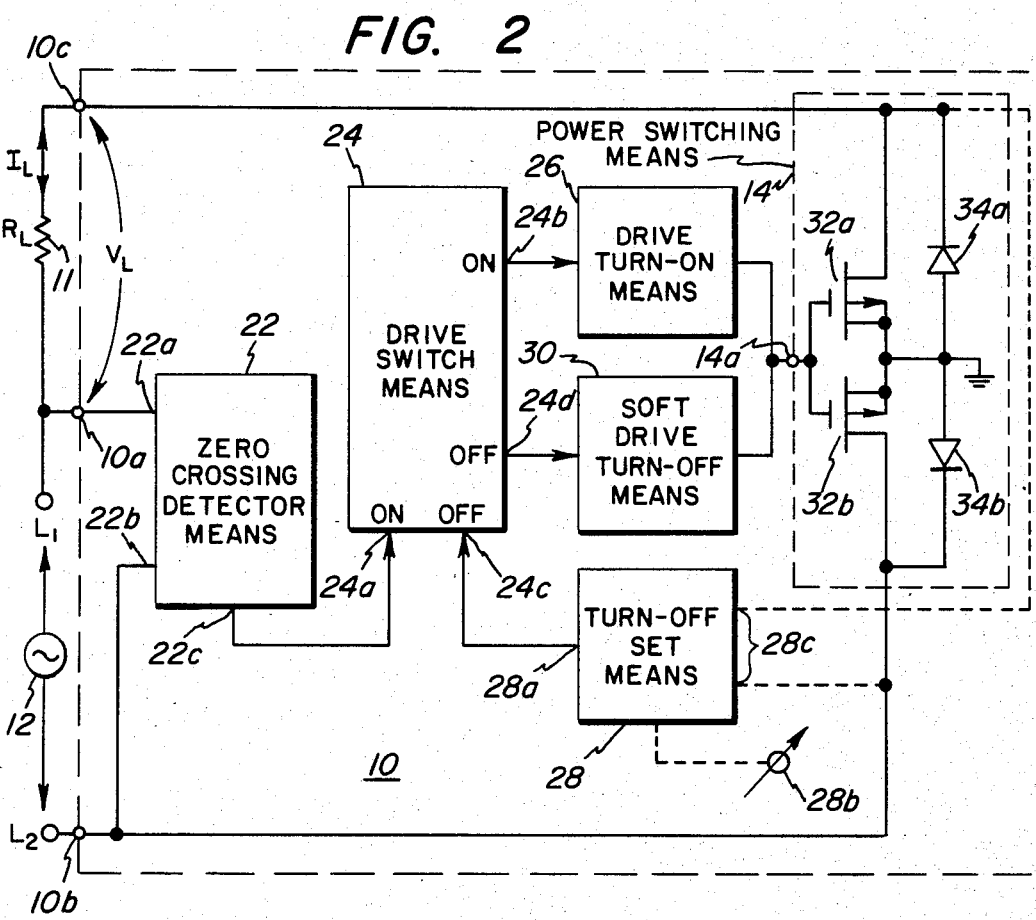
FIG. 2

REVERSE-PHASE-CONTROL POWER SWITCHING CIRCUIT AND METHOD

BACKGROUND OF THE INVENTION

The present application relates to load power switching circuits and, more particularly, to a novel reverse-phase-control method and power switching circuit for controlling the conduction angle of devices applying A.C. current to a load.

It is well known to control the voltage and/or current applied to a load from an A.C. source by means of a phase-control circuit, in which a switching device is turn "on" to a conductive condition at a time after the zero crossing of the A.C. periodic waveform and the device, which is usually a regenerative switching device, is allowed to commutate "off" at the next zero crossing of the waveform. One of the more serious disadvantages of this type of phase-control circuit is that the load voltage and current undergo a sudden change when the switching device is turned "on" and this sharp change in current flow generates large amounts of electromagnetic interference (EMI). Another disadvantage of this type of phase-control circuit is the relatively high cost of such a circuit, when controlling loads having large in-rush current requirements. Thus, a tungsten filament lamp and the like loads, have relatively low "cold" resistances when first energized. The very large instantaneous current drawn by such a "cold" load requires that either the switching device be oversized to handle this large in-rush current, or that additional control subcircuits must be provided in the phase-control circuit, to slowly phase forward the conduction point an acceptable amount, until the load resistance has increased to the point that the load draws a "normal" operating current.

It is therefore highly desirable to provide a phase-control circuit which is not only capable of slowly increasing the device current, to provide an auto-soft-start capability for loads with high in-rush currents, but which also can provide reduced levels of EMI, with a relatively low circuit cost.

BRIEF SUMMARY OF THE INVENTION

In accordance with the invention, a reverse-phase-control power switching circuit for controlling the flow of current through a load, from an A.C. source, includes: at least one power switching device in series with the load across the source; means for controlling the power switching means to a conductive condition, responsive to each source voltage waveform zero crossing; and means, responsive to the first occurring one of the instantaneous load current exceeding a maximum current, greater than the desired normal peak load current, or the desired conduction angle being attained, for terminating conduction of current through the power switching means. Preferably, the conduction-termination, or the drive turn-off, means provides for the relatively gradual cessation of load current flow, to reduce the EMI level.

In presently preferred embodiments, the load current conduction turn-off level may be set by a manual control, and may also be turned off if the power switching device is removed from saturation, due to an excessive demand for load current, exceeding the maximum power switching device saturation current capability set by the power switching device drive signal magnitude.

Accordingly, it is an object of the present invention to provide a novel reverse-phase-control power switching circuit for controlling the flow of current through a load from an A.C. source.

It is another object of the present invention to provide a novel method for reverse-phase-control of the conduction-angle of current flow through a load from an A.C. source.

These and other objects of the present invention will become apparent upon consideration of the following detailed description, when read in conjunction with the drawings.

BRIEF SUMMARY OF THE DRAWINGS

FIGS. 1a and 1b are graphs respectively illustrating the load voltage and load current obtained with the reverse-phase-control power switching circuit of the present invention, for a load connected in series therewith across an A.C. source, and useful in understanding the principles of operation of the present invention;

FIG. 2 is a schematic block diagram of a reverse-phase-control circuit in accordance with the principles of the present invention.

DETAILED DESCRIPTION OF THE INVENTION

Figure 2A:
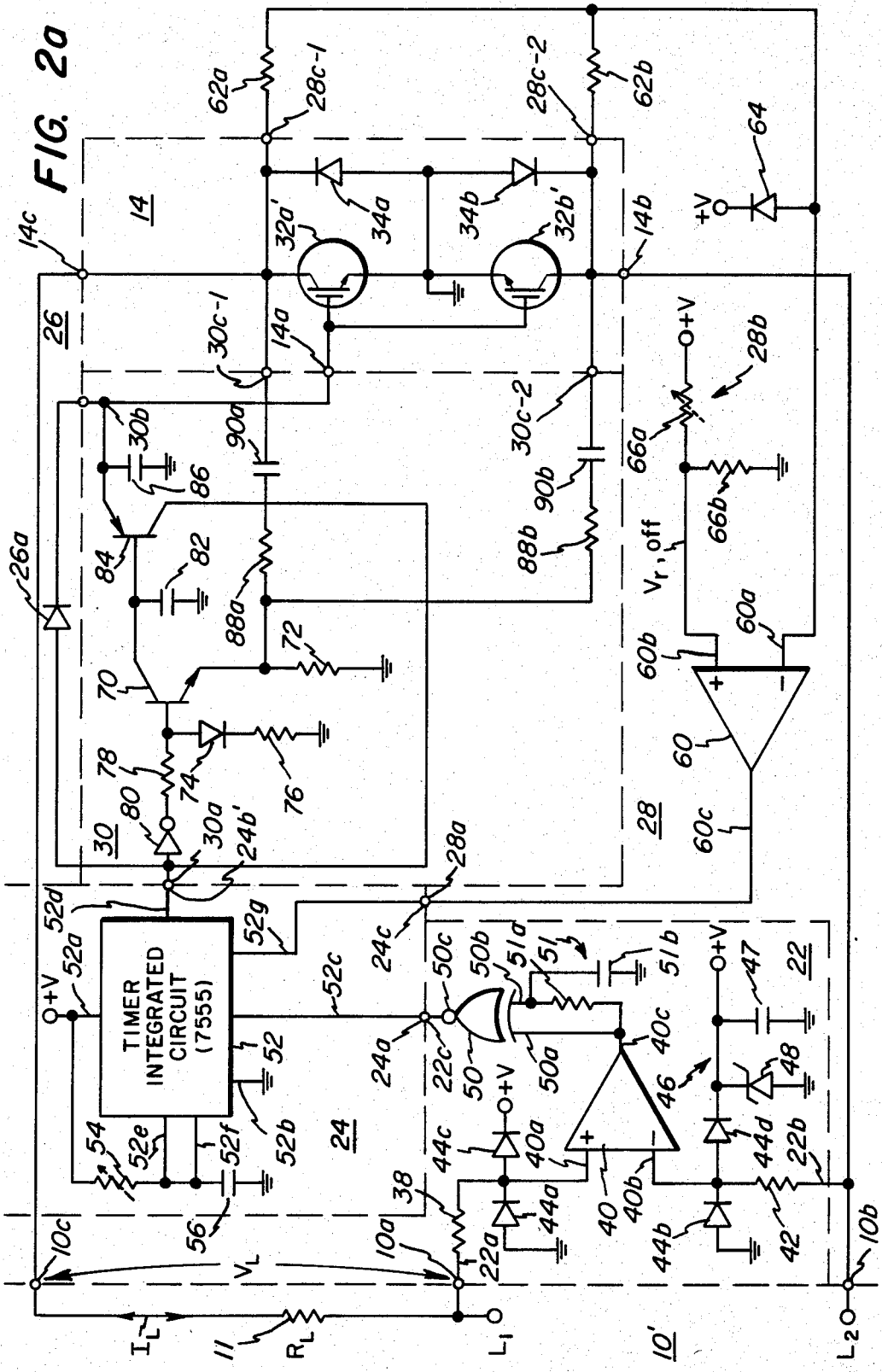
FIGS. 2a and 2b are schematic diagrams of two presently preferred embodiments of the generic circuit of FIG. 2.

Referring initially to FIGS. 1a, 1b and 2, a reverse-phase-control power switching circuit 10 is in series with a resistive load 11, of magnitude $R_L$, between power line terminals $L_1$ and $L_2$, and thus across an A.C. power source 12. First line terminal $L_1$ is also connected to a first terminal 10a of the control circuit, while second line terminal $L_2$ is connected to another terminal 10b of the control circuit. Load 11 is connected between first line $L_1$ circuit terminal 10a and a third circuit terminal 10c. A power switching means 14, within circuit 10, is connected between circuit terminals 10b and 10c, and thus in electrical series connection with load 11, across source 12.

The load voltage $V_L$ would be a voltage sinusoid 16 (FIG. 1a) if power switching means 14 were conducting during the entire sinusoidal source waveform cycle. In a conventional phase-control circuit, a switching device, in series with a load across an A.C. source, would be switched on at some time after each zero crossing $t_0$ (i.e. either a positive-going zero-crossing 18a time $t_0^+$ or a negative-going zero-crossing 18b time $t_0^-$) to produce a sudden change 17, in the appropriate one of the positive and negative directions, dependent upon the polarity of the half cycle then in progress. The accompanying sudden change in load current $I_L$ (not shown) produces relatively large amounts of EMI. The switching device would conduct until the next zero crossing, at which time the device (typically a regenerative switching device) turns itself off and remains off until abruptly turned on at a later time in the next half cycle. A)so as previously mentioned, relatively complex circuitry might be utilized to move the switching edge 17, e.g. edge 17a, forward, in the direction of arrow A, from the turn-off zero crossing, e.g. first negative-going zero crossing 18b at time $t_0^-$, to occur as a switching edge 17b at an earlier time, closer to a subsequent turn-off zero crossing, e.g. first positive-going zero crossing 18a' at a time $t_0^+$, to slowly increase device current and accommodate a "cold" resistance, thus allowing a switching device of reasonable current-carrying-capacity to be utilized.

In the reverse-phase-control power switching circuit 10 of the present invention, power switching means 14 is turned "on", to the current-conductive condition, at each zero-crossing point 18 (i.e. each of positive-going zero crossings 18a, 18a', 18a'', etc., at time $t_0^+$ and each of negative-going zero crossings 18b, 18b', 18b'', etc. at times $t_0^-$) and is turned "off" at some time (e.g. one of times $t_1, t_2, t_3, t_4, t_5, t_6, \ldots$) thereafter, but prior to the next zero-crossing point 18. The interval, shown in hatched line segments in FIG. 1a, during which power switching means 14 is conductive therefore begins, for an increasing-voltage (positive-going) zero crossing 18a, at time $t_0^+$, and extends to a "turn-off" time $t_1$, which occurs prior to the next subsequent, decreasing-voltage (negative-going) zero crossing 18b. At the next zero crossing 18b, power switching means 14 is again turned "on" and remains "on" until a new "turn-off" time $t_2$, prior to the next-occurring, increasing-voltage zero crossing 18a'. Concurrently, the load current $I_L$ (FIG. 1b) is enabled to flow at substantially a zero magnitude at each zero crossing (e.g. crossings 18a, 18b etc.), and increases to some maximum value $I_M$, at time $t_1$, before current flow is terminated. The current termination edge, e.g. edge 20a', may be provided with a relatively gradual slope, to substantially reduce the EMI effects thereof, relative to the abrupt current change occurring in a forward-phase-control circuit. Further, if a cold-resistance load 11 is to be controlled, subject to high in-rush current, the maximum current $I_M$ level may be set at a value somewhat higher than the normal operating peak current of the load (after warm-up) and the turn-off time $t_n$ (where n=1, 2, 3, 4, 5, 6, etc.), after each turn-on zero crossing, gradually increases, in the direction of arrow B, to "soft-start" the load and allow gradual warm-up. This is in complete contradistinction to the direction of change of the turn-off edge for a forward-phase-control circuit, especially when current flow to a "cold" load is to be initiated. Thus, as shown in FIGS. 1a and 1b, circuit 10 may provide, during a "cold resistance in-rush" condition, for turning off power switching means 14 at a time $t_1$ after the first turn-on zero crossing 18a and at time $t_2$ after the second turn-on zero crossing 18b, where the interval between the time $t_0^+$ zero crossing 18a and time $t_1$ is less than the time interval between the next zero-crossing 18b time $t_0^-$ and the turn-off time $t_2$ thereafter. Similarly, the time, during which current flows through the load, between a third turn-on zero crossing 18a' and a third turn-off time $t_3$ can be made larger than the second conduction interval, between turn-on zero crossing 18b and turn-off time $t_2$. Thus, the duration of current flow through the load, and the amount of power dissipated therein, can be gradually increased as load current portions 20 are increased. That is, while each current portion 20 peak current $I_M$ is substantially the same, the conduction intervals change and the average load current of portion 20a is somewhat smaller than the average load current of portion 20b, which is itself somewhat smaller than the average load current of portion 20c. As the average load current decreases, responsive to an increase in the load resistance, the normal operating load current is soon reached and load current conduction portions 20d, 20e, 20f . . . are all of approximately the same shape and magnitude (which magnitude is generally less than the set maximum current magnitude $I_M$), as provided by circuit 10 setting the associated load turn-off times $t_4, t_5, t_6, \ldots$ (after the associated one of zero crossings 18b', 18a', 18b'', . . . )to be substantialy equal, commensurate with the load current $I_L$ for the established conduction-angle.

The foregoing operation is provided (FIG. 2) by use of a zero-crossing detector means 22 having first and second inputs 22a and 22b, respectively, connected to circuit first and second inputs 10a and 10b, respectively. At each zero crossing of the source 12 voltage between line terminals $L_1$ and $L_2$, a zero-crossing signal appears at the zero-crossing detector means output 22c. The zero-crossing signal at output 22c is coupled to a first, (ON) input 24a of a drive switch means 24. Responsive thereto, a first (ON) output 24b is enabled to cause a subsequent drive turn-on means 26 to apply drive to a drive input 14a of the power switching means 14 and cause current conduction to commence therethrough, between terminals 14b and 14c. A second (OFF) output 24d may, if required, be simultaneously disabled when the first (ON) output 24c is enabled. A turn-off set means 28 provides, at an output 28a thereof, a turn-off signal to a second (OFF) input 24c of drive switch means 24. The turn-off signal is provided at a time, after each zero crossing, established by means of an associated control 28b (which may be part of drive switch means 24, or may be, as illustrated, part of turn-off set means 28). The turn-off signal may be responsive to the load current exceeding the set maximum load current $I_M$, as represented by one, or both, of the signals at input 28c, monitoring the voltage across power switching means 14 and/or load resistance 11. Responsive to the receipt of a turn-off signal at second (OFF) input 24c or otherwise, drive switch means 24 enables a second (OFF) output 24d, to cause a subsequent drive turn-off means 30 to remove drive from power switching means drive input 14a and terminate means 14 conduction and end load current $I_L$ flow; means 30 may be a "soft" turn-off means which causes the switching device input 14a drive to be reduced in a relatively gradual manner, thus causing load current $I_L$ conduction through power switching means 14 to gradually decrease to termination, with reduced EMI production. It should be understood that drive turn-off means 30 may, if desired, cause abrupt termination of the drive signal to power switching means 14, with an associated abrupt cessation of load current $I_L$ flow, if a gradual cessation is not desired or required. If required, enablement of second output 24d may be simultaneously accompanied by a disablement of output 24c, although the latter output 24c is generally disabled at the enablement of output 24d, and kept disabled until subseqnently re-enabled by a next zero-crossing signal at input 24a. It will be further understood that, as power switching means 14 is to be turned on at a source waveform zero crossing, the load current is, for a substantially resistive load 11, then substantially at a zero magnitude, and no purpose would be served by gradually applying the turn-on drive signal to input 14a. Drive turn-on means 26 and drive turn-off means 30 may be of the type described and claimed in copending application Ser. No. 499,579, filed May 31, 1983, assigned to the assignee of the present invention and incorporated herein in its entirety by reference. Turn-off set means 28 may utilize the circuitry described and claimed in co-pending application Ser. No. 499,590 filed May 31, 1983, also assigned to the assignee of the present invention and also incorporated herein in its entirety by reference.

Figure 2B:
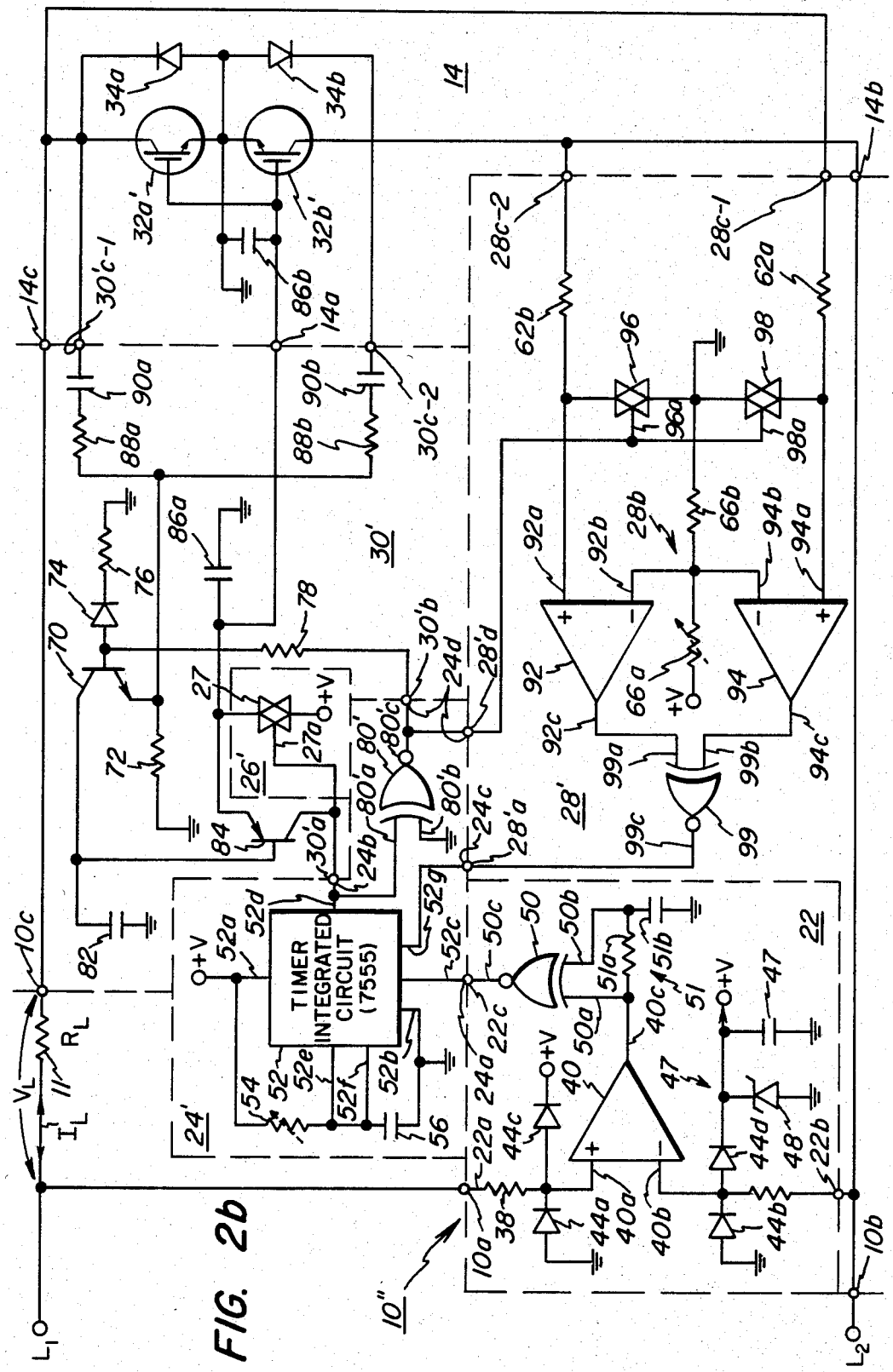

A number of different embodiments for power switching means 14 are possible: power field-effect transistors (FETs), e.g. as illustrated in FIG. 2; power bipolar transistors; insulated-gate rectifiers (IGRs) or transistors (IGTs), e.g. as illustrated in FIGS. 2a and 2b, and the like, may all be utilized. In general, power switching means 14 can be provided by any means capable of being turned on to conduct an A.C. current and subsequently being turned off, to cease conduction of that current, with a non-zero voltage across that means and with a non-zero current flowing through that means. Thus, as illustrated in FIG. 2, power switching means 14 may comprise a pair of power FETs 32a and 32b, having the drain-source, current-conduction channels thereof connected in series between switching means terminals 14b and 14c, i.e. between circuit terminals 10b and 10c, and with the control (gate) electrodes thereof connected in parallel, to control input 14a. As power FETs 32a and 32b are ideally unidirectional-conducting devices, one of a pair of reverse-conduction diodes 34a and 34b is connected across the drain-source circuit of each, and poled in a current-conducting direction opposite to the current-conducting direction of the respective device 32 to be protected. Practical and presently-available power FETs 32 typically have parasitic diodes 34 already formed in parallel with their controlled-conduction channels and poled in the proper direction; external diodes 34 would not then be required. The common connection point of the FETs 32 and diodes 34 is coupled to a circuit common potential point. In FIGS. 2a and 2b, the controlled switching devices 32a' and 32b' are each an insulated-gate transistor, each having the control (gate) input thereof connected to power switching means control input 14a, and, as IGTs do not normally have parasitic diodes, each has its anode-cathode current-conduction path in parallel connection with a reverse-conduction diode 34. The common connection between the pair of insulated-gate transistors and their parallel diodes is, again, coupled to a circuit common potential point.

Referring now to FIG. 2a, a first presently preferred embodiment of reverse-phase-control power switching circuit 10' is illustrated. The same zero-crossing detector means 22 is utilized in both this first embodiment and a second preferred embodiment 10'' of FIG. 2b. The first detector input 22a is connected through a limiting series resistance 38 to the non-inverting + input 40a of a first comparator 40. The second zero-crossing detector input 22b is connected through another limiting resistance 42 to an inverting - input 40b of the comparator. First and second protection diodes 44a and 44b each have their anodes connected to the circuit common potential and their cathodes connected to the associated one of comparator inputs 40a and 40b. A second pair of protection diodes 44c and 44d each have the cathodes thereof connected to a positive operating potential +V and have their respective anodes thereof each connected to an associated one of comparator inputs 40a and 40b. The operating potential +V is derived from a source 46 which includes a capacitance 47, parallelled by a zener diode 48, having a zener voltage of +V volts; when input terminal $L_2$ is positive with respect to circuit common, and of a magnitude somewhat greater than +V volts, current flows through resistance 42 and forward-biased diode 44d, to charge capacitance 46 to the +V maximum voltage set by zener diode 48. Similarly, when terminal $L_1$ is positive with respect to circuit common, current flows through resistance 38 and diode 44c to also charge capacitor 47.

At each zero crossing of the voltage between terminals $L_1$ and $L_2$, the voltage at a first comparator output 40c abruptly changes amplitude. This amplitude change is directly coupled to a first input 50a of an exclusive-NOR gate 50, receiving a delayed version of the amplitude change at its remaining input 50b, by action of a delay circuit 51 (itself including a series resistance 51a and shunt capacitance 51b). Thus, for every input voltage waveform zero crossing, the gate 50 inputs 50a and 50b are at different amplitudes for a short time, dependent upon the delay introduced by delay means 51, and the gate output 50c changes from a higher resting voltage level to a lower voltage level, providing a pulse responsive to the zero crossing. This pulse is provided at zero-crossing detector output 22c, to switch drive means first ON input 24a.

Switch drive means 24 utilizes a timer integrated circuit, such as the standard 7555 integrated circuit and the like. The timer integrated circuit 52 is provided with operating potential +V at a first input 52a, with respect to circuit common potential at another terminal 52b. The trigger input terminal 52c is connected to first ON input 24a of the drive switch means, and receives the negative-going zero-crossing pulses from zero-crossing detector means 22. Responsive to each negative-going pulse applied to input 52c, an output terminal 52d is set to a higher output voltage level. In the embodiment of FIG. 2a, the switch drive means has a common output 24b', utilized (a) to enable drive turn-on means 26 and disable drive turn-off means 30 at a higher output voltage level, and (b) to disable turn-on means 26 and enable turn-off means 30 at a lower output voltage level. Thus, output terminal 52d becomes the single switch drive means output 24b'. A discharge terminal 52e and a threshold terminal 52f are connected in parallel; this parallel connection is itself connected through a timing resistance 54 to positive operating potential +V and through a timing capacitive element 56 to circuit common potential. A reset input 52g is connected to drive switch means second OFF input 24c.

Drive turn-on means 26 comprises a unidirectionally-conducting device, e.g. a diode 26a, which becomes forward biased when receiving the higher-voltage "ON" level at drive switch means common output 24b'. This voltage is applied through conducting diode 26a to power switching device input control terminal 14a, turning on that one of switching devices 32 then having a positive potential at the anode thereof (dependent upon the plurality of the waveform half-cycle of the source connected between line terminals $L_1$ and $L_2$). Load current $I_L$ begins to flow sequentially through load resistance 11, into one of power switching means terminals 14b or 14c, and then through that one of devices 32a or 32b in the conductive condition, and thence through the diode 34b in parallel with the other non-conducting device 32 before flowing out of the remaining one of power switching device terminals 14c or 14b. The forward-conduction voltage drop across the conducting one of power switching devices 32a' or 32b' is monitored by connection of the anode of each power switching device to a separate monitoring terminal 28c-1 or 28c-2. The forward conduction voltage, at one of terminals 28c-1 or 28c-2 associated with a conducting device 32, is supplied to the inverting - input 60a, of a second comparator 60, through an associated one of a pair of limiting resistances 62a or 62b. Inverting input 60a is also connected to the anode of a protection diode 64, having its cathode receiving positive operating potential +V, such that the comparator input 60a voltage never substantially exceeds the operating potential +V, even if the voltage across one of power switching devices 32a' and 32b' has a magnitude exceeding the magnitude +V of the operating potential. A non-inverting + input 60b of second comparator 60 is connected to the turn-off set means control subcircuit 28b, illustratively providing a fixed turn-off reference potential $V_{r, off}$, as at the common junction between a pair of voltage divider resistance elements 66a and 66b, connected in series between operating potential +V and the circuit common potential. An output 60c of the second comparator is connected to the turn-off set means output 28a and thence to drive switch means second (OFF) input 24c and reset terminal 52g. Thus, whenever the forward conduction drop of the conducting switching device 32a' or 32b' is of a magnitude providing an input 60a voltage exceeding the fixed reference potential $V_{r, off}$ at input 60b, the comparator output 60c changes state, falling to a relatively low voltage, and resets the switch drive means timer common output 24b' to a relatively low (OFF) voltage. For a load 11 having a lower resistance at start-up, with respect to the normal "hot" operating resistance, the resetting of output 24b' will occur relatively sooner after the setting thereof, due to the high in-rush current at initial load turn-on, and the time interval between setting and resetting of output 24b' will gradually increase as the magnitude of the resistance $R_L$ of load 11 increases with time, as the load tends toward steady-state conditions.

It will be seen that drive turn-on means 26 diode 26a substantially instantaneously applies the higher-voltage level at common output 24b' to the switching device control input 14a. When common output 24b' is reset to the lower voltage level, responsive to a falling-voltage edge at second comparator output 60c, diode 26a is reverse-biased, and that one of power switching devices 32a' or 32b' then conducting is turned off by action of soft drive turn-off means 30.

Means 30 includes a current-source transistor 70, having the emitter electrode thereof connected through a current-setting resistance 72 to common potential. The base electrode of transistor 70 is connected to common potential through a temperature-compensation diode 74 (having the anode thereof connected to the base electrode) and a first bias resistance 76. A second bias resistance 78 is connected between the transistor 70 base electrode and the output of a logic inverter 80. The inverter input is connected to turn-off means input 80a. A charging capacitance 82 is connected between ground potential, the collector electrode of NPN transistor 70, and the base electrode of an opposite-polarity (PNP) source-follower transistor 84. The emitter electrode of second transistor 84 is connected to drive turn-off means output terminal 30b, at power switching means control input terminal 14a. A stabilization capacitance 86 may also be connected between output 30b and common potential. The collector electrode of transistor 84 is connected to the drive turn-off means input terminal 30a. The junction between transistor 70 emitter electrode and current-setting resistance 72 is connected to one terminal of each of a pair of resistance elements 88a and 88b, each having the remaining terminal thereof connected through an isolation capacitance 90a or 90b, to first and second turn-off control terminals 30c-1- or 30c-2, respectively. Each of terminals 30c-1 and 30c-2 is connected to the anode of the associated one of power switching devices 32a' or 32b', in parallel with the associated one of outputs 28c-1 or 28c-2.

The operation of soft drive turn-off means 30 is more fully described and claimed in the afore-mentioned co-pending application Ser. No. 499,579. Briefly, while common output 24b is at a high voltage level, a lower voltage level is present at the output of inverter 80, placing the current-source transistor 70 in the cutoff condition. The voltage at the collector of the voltage-follower transistor 84 is now higher, by the magnitude of the voltage drop across diode 26a, than the emitter voltage on the same transistor, whereby transistor 84 is also cut off. Therefore, turn-off means 30 does not affect the drive turn-on operation of power switching means 14. When drive switch means common output 24b' falls to a lower-voltage level, diode 26a is reverse-biased and effectively removed from the circuit; the output of inverter 80 rises to a higher voltage, enabling current source transistor 70. The lower voltage at input terminal 30a now places the collector electrode of transistor 84 at a lower potential than the emitter potential thereof (established due to the charge stored in the gate control structure of the switching devices and stabilization capacitance 86, if used), whereby voltage-follower transistor 84 is also in the active condition. Charge is withdrawn from capacitor 82, through current-source transistor 70, at a rate initially established by the magnitude of current-setting resistance 72. As charge is withdrawn from capacitor 82, voltage-follower transistor 84 causes the voltage at control input terminal 14a to decrease at a relatively rapid rate, causing the switching device drain-source voltage to decrease until the device saturation threshold voltage is reached and the device begins to turn off. The power switching device departs from the saturation region and enters the active region and a significant anode dV/dt change occurs as the load current $I_L$ begins to decrease. The increase in switching device drain-source voltage dV/dt is coupled through the associated one of capacitors 90a or 90b (dependent upon which of devices 32a' or 32b' was active and is now being turned off) and causes a current to be injected through current-setting resistance 72. As the voltage across resistance 72 must remain substantially constant while the current source transistor is enabled, the collector current flowing through transistor 70 temporarily decreases and the rate-of-change of voltage across capacitance 82 is temporarily decreased, such that the rate-of-change of the gate control 14a input voltage is temporarily slowed. This slower decrease in gate control voltage temporarily slows the decrease in load current $I_L$, resulting in a slower, or "soft" turn-off. Typically, switching device dV/dt is limited to about 5 volts per microsecond to obtain acceptable levels of line-conducted EMI and anode voltage overshoot, with typical values of power line inductance (thus obviating the need for filters, snubbers, and the like). Once the switching device has reached a minimum threshold level, the voltage rate-of-change thereacross decreases, reducing the amount of current injected through the appropriate one of resistors 88 into resistor 72, and again allows a greater current to be withdrawn from capacitor 82. Responsive to the greater rate-of-change of voltage across capacitance 82, the voltage at means output 30a, and at power switching device gate control input 14a, again decreases at a very rapid rate to place the output switching devices firmly in the cutoff region.

The above-described cycle, of turning the power switching means 14 on at a zero crossing and turning that power switching means off sometime thereafter, as determined by the load current and/or power switching device conduction characteristics, continues, with increasing duration of each interval during which the power switching means is turned on during the gradually "heating" up of the load resistance 11 and the associated increase in the resistance thereof. Thus, as the load warms up, the time required for the load current to reach the peak allowable current $I_M$ increases and the turn-off time moves later into the half-cycle, after each zero-crossing turn-on. Eventually, each turned-on portion will increase in duration until the load is drawing normal, steady-state current which is less than maximum current magnitude $I_M$ (since $I_M$ was deliberately set to be somewhat greater than the desired average load current). To maintain normal operation of the load, the timer circuit 52 has a time constant (proportional to the product of the resistance 54 and capacitance 56) established such that the output 24b' reset threshold is reached, by the integrating voltage at input 52f, before a reset signal is applied to input 24c, in the normal-current condition. Output 24b' is thus reset and power switching means 14 turned off; simultaneously, discharge terminal 52e drains charge off of timing capacitor 56. When the next zero crossing of the source waveform occurs, input 24a receives an "on" signal; the power switching means is turned on and the discharge terminal 52e is disabled. Capacitor 56 begins to charge, toward operating potential +V, while the higher-voltage level output 24b' is present and load current flows; when the voltage across capacitor 56 reaches the threshold level, the lower-voltage level is again enabled at output 24b' and both the power switching means 14 and timer means 52 are reset for the next cycle. Thus, it is only when at least one high-current "on" period occurs, as due to in-rush current, will turn-off set means 28 turn off the timer output 24b', before the "timing-out" of the resistance 54-capacitance 56 integration process. In many non-in-rush uses, open loop control of the average load current obtained by control of the "on" time will be acceptable and can be achieved by varying the magnitude of timing resistance 54 (as indicated by the variable resistance "control" arrow, shown in broken line). In applications where peak current control is desired, control of maximum current $I_M$ is possible by making the off-reference voltage variable, as by changing the magnitude of resistance 66a (with the variable resistance "control" arrow also shown in broken line). In some cases, the two variable controls (resistances 56 and 66a) may be desired and the control mechanisms thereof may be ganged together, as necessary, to vary the maximum current $I_M$ (by action of resistor 66a) with a variation in normal current (by action of resistor 56).

It is highly desirable to integrate as much as possible of circuit 10' into a single integrated circuit package; the single integrated circuit can include the pair of switching devices of means 14 (for lower average current loads) or can be utilized with a pair of external power switching semiconductors (each of which often has a reverse-poled parasitic diode formed as part of its structure), such that a maximum of three discrete components are necessary to form the entire reverse-phase-control circuit for controlling the current magnitude applied to external load 11. Even if one or more external variable resistors are required, e.g. to set the off-reference voltage $V_{r, off}$ (as with a potentiometer connected as adjustment means 28b and/or a rheostat for establishing the value of timing resistance 54) to accommodate loads of different steady-state current requirements, the entire circuit may be provided with a minimum of components. While this minimum-parts-count configuration is highly desirable, use of circuit 10' is less than ideal in one respect: the use of a single comparator in means 28, with both monitoring resistors 62 having a terminal, commonly connected to an input of such single comparator, may present temperature compensation problems. The voltage at the junction between resistors 62a and 62b is, with respect to ground, dependent upon the conduction-channel saturation voltage of the conducting device 32a' or 32b', and the voltage drop of the forward-biased protection diode 34b or 34a across the remaining, non-conducting switching device. Thus, this comparator input voltage $V_c$ is, for substantially equal magnitudes of resistors 62, given by $V_c=(V_a+V_d)/2$, where $V_a$ is the saturation voltage of the conducting power switching device and $V_d$ is the conducting diode voltage drop. At least one of the conducting switching device saturation voltage $V_a$ and/or the conducting protection diode voltage $V_d$ is temperature sensitive, whereby the comparator input voltage $V_c$ varies with ambient and device temperatures, and therefore with changes in diode voltage drop $V_d$ due to variations of the normal, steady-state load current $I_L$. If the reference voltage $V_{r, off}$ setting means 28 is designed to temperature compensate for these changes in comparator input voltage, little problem exists; use of the saturation-monitoring circuitry of the abovementioned copending application Ser. No. 499,590 may compensate for changes in switching device saturation, but not in protection-diode voltage drop. However, if subcircuit 28b is a pair of resistance elements formed in an integrated circuit, which may not even be located close to the protection diodes 34a and 34b (and therefore cannot sense changing temperature thereof), temperature compensation is not easily achieved.

The temperature compensation problem is substantially alleviated by use of the second preferred circuit embodiment 10', of FIG. 2b, in which ike reference designations refer to like elements. It will be seen that zero-crossing detector 22 is identical to the zero-crossing detector of first embodiment 10'. The drive switch means circuit 24' is provided with an additional exclusiveNOR gate 80', having a first input 80'a connected to the first (ON) output terminal 24b, and having a second input 80'b connected to common potential. The gate acts as an inverter, such that its output 80'c, connected to drive switch means second (OFF) separate output 24d, is at the opposite voltage level from the voltage level provided at first (ON) output 24b. It will also be seen that (soft) turn-off means 30' is similar to soft turn-off means 30 of FIG. 2a, with the exception of a sharing of stabilization capacitors 86a and 86b between the turn-off means and the power switching means 14' (often necessitated by the difficulty of providing large-magnitude capacitance as part of an integrated circuit), and by the connection of current-source biasing resistance 78 to a separate input terminal 30b', itself connected to the now-separate second (OFF) output of the drive switch means. Turn-on means 26' is a controllable, bidirectionally-conductive switching element 27, connected between the operational potential +V source and the power switching means control (gate) input terminal 14a, and having a control input 27a connected to the first (ON) output 24b of the drive switch means.

Conductive element 27 is gated to a low-impedance condition responsive to a higher-voltage level at input 27a, to turn the power switching devices on by application of the operating potential V to the gate electrodes thereof responsive to energization of the first (ON) output 24b, and is turned off by the presence of the lower-voltage level at output 24b, to present a very high-impedance between the operational voltage +V source and control input 14a.

Turn-off set means 28' is reconfigured to utilize a pair of comparators 92 and 94. The non-inverting + input 92a or 94a of each inverter is connected to that terminal of the associated monitoring resistance 62b or 62a, furthest from the associated monitoring terminal 28c-2 or 28c-1. Each of the non-inverting inputs 92a or 94a is connected through a controllable, bidirectionally-conducting switch means 96 or 98, to common potential. The control inputs 96a or 96b of the switch means 96 or 98, respectively, are connected in parallel to another input 28'd, itself connected to the drive switch means second (OFF) output 24d. Each of the comparator inverting - inputs 92b and 94b is connected to the reference potential-supplying junction of means 28b, i.e. at the junction between resistors 66a. and 66b. *The first comparator output 92c is connected to a first input 99a of another exclusiveNOR gate 99, while the remaining input 99b is connected to the output 94c of the remaining comparator. The gate output 99c is connected to the turn-off means output 28'a and thence to the second (OFF) input 24c of the drive switch means 24'.*

In operation, consider first the case of a load 11 either of substantially-constant load resistance $R_L$ magnitude, or of non-constant load resistance, but in operation for a sufficiently long time that the load current in-rush phenomena has ended. Load current $I_L$ flow is initiated at each source waveform zero crossing by the negative-going pulse at detector output 22c, causing drive switch means output 24b to the higher level voltage and drive switch means output 24d to the lower level voltage. Responsive thereto, the conductive element 27 of turn-on means 26' conducts and provides a sufficiently large positive gate potential to turn on that one of power switching devices 32a' or 32b' then having a positive anode potential. Current flows from one line terminal through the series connection of load resistance 11, the then-conducting one of switching devices 32a' or 32b', and the then-conducting one of protective diodes 34a or 34b, to the other line terminal. Since the second output 24d voltage is low, the current source transistor 70 of turn-off means 30' is disabled, while the source-follower transistor 84 of the same means is disabled by the higher collector voltage at input 30a'. The low output 24d voltage also places switching elements 96 and 98 in the high-impedance condition, rendering turn-off set means 28' operative. However, since the high in-rush current period has passed, an "off" pulse would normally not be generated at gate output 99c (unless the load current suddenly increases to be greater than the set maximum load current $I_M$) and the switching of timer integrated circuit output 52d is normally controlled by the charging time of timing resistance 54 and timing capacitance 56. At such time as the threshold input 52f voltage reaches the appropriate level, output 52d is switched, providing the lower output voltage at first (OFF) output 24b and the higher voltage at second (OFF) terminal 24d. Responsive thereto, switching element 27 is turned off, while the soft turn-off means 30' is enabled, to gradually terminate load current flow, in the manner described hereinabove. Simultaneously therewith, the higher voltage at output 24d is presented at the control inputs 96a and 98a of switching elements 96 and 98, providing relatively low impedances from each of the comparator inputs to circuit common, thereby disabling the turn-off set means and preventing a false turn-off signal from appearing at second (OFF) input 24c. of the drive switch means, and possibly interfering with the next subsequent turn-on thereof at the next subsequent source waveform zero crossing. Average load current $I_L$ is thus controlled in open-loop manner, with provision for prevention of gross over-current (fault) flow, during normal operation.

The high in-rush current operation is substantially similar to the operational sequence described hereinabove, with respect to turn-on and commencement of current flow through power switching means 14, responsive to each source waveform zero crossing. Load current turn-off is, as in embodiment 10' of FIG. 2a, substantially controlled by the turn-off set means 28'. However, as the instantaneous value of load current $I_L$ attains the maximum $I_M$ value, the associated switching device saturation voltage, appearing at one or the other of monitoring terminals 28c-1 or 28c-2, is applied solely through the associated one of current-limiting resistor 62a or 62b respectively, direct)y to the associated comparator input 94a or 92a, respectively, without voltage division and without influence of the temperature-related voltage drop of the conducting protective diode across the non-conducting one of the power switching means devices. Since the switching device saturation voltage monitoring occurs during the "on" portion of the power switching means operation, drive switch means output 24d is in the low voltage condition and both switching elements 96 and 98 have been controlled to the high impedance condition, and are effectively open-circuited. Due to the high input impedance of each of comparators 92 and 94, the voltage at the non-inverting inputs 92a and 94a thereof is essentially proportional only to the voltage across the associated switching device 32a' or 32b', and temperature-related effects are considerably reduced. Thus, when the instantaneous load current exceeds the maximum current $I_M$ related to a device saturation voltage, itself set by the reference potential at comparator inputs 92b or 94b, the appropriate one of comparator outputs 92c or 94c changes to a voltage level different from the voltage level at the remaining comparator output, providing a negative-going change at gate output 99c, resetting timer circuit 52 and switching the voltage levels at drive switch means outputs 24b and 24d, respectively. As in the first embodiment, the length of conduction time after each zero-crossing turn-on point is dependent upon the present resistance of the load 11, which increases in controlled fashion, by action of means 28' increasing the "on" time interval until the in-rush current phenomena ends, and normal operation of the circuit continues, in the manner described hereinabove.

While several presently preferred embodiments of my novel reverse-phase-control power switching circuit have been described in detail herein, many variations and modifications will now become apparent to those skilled in the art. It is my intent, therefore, to be limited only by the scope of the appending claims, and not by the details and instrumentalies presented by way of explanation of operation of my invention, as presented herein.

What is claimed is:

1. A reverse-phase-control power switching circuit for controlling the angle of conduction of current flow through a load from an A.C. source, comprising:

power switching means, in electrical series connection with said load and said source, for allowing a flow of current through said load responsive to a first input condition, and for disabling current flow through said load responsive to a second input condition;

first means for providing said first input condition to said power switching means to cause current to flow through said load commencing substantially at, and responsive only to, each zero crossing of the A.C. signal waveform of said source; and second means for providing said second input condition to said power switching means at a termination time, after the occurrence of each zero crossing and prior to the next successive zero-crossing occurrence, selected to establish the desired conduction angle of current flow through said load.

2. The circuit of claim 1, wherein said second means includes non-thermal means operating only responsive to each occurrence of said second input condition for gradually, but completely, changing said first input condition to said second input condition in less than one-half cycle of said A.C. source signal waveform, to decrease the flow of current through said power switching means at a predetermined rate less than the fastest rate at which current flows through said power switching means can be terminated.

3. The circuit of claim 1, further comprising: third means, devoid of any magnetic component, for providing to said second means a turn-off signal responsive to the instantaneous current flowing through said load exceeding a preset maximum current; said second means providing said second input condition at said power switching means responsive to said turn-off signal occurring prior to the termination time established by said second means.

4. The circuit of claim 3, wherein said third means includes: non-magnetic means for monitoring the instantaneous current flowing through said power switching means and for developing a monitor voltage related thereto; means for establishing a reference voltage; and comparison means for generating said turn-off signal as soon as said monitor voltage exceeds said reference voltage.

5. A method for controlling the angle of conduction of current flow through a load from an A.C. source, comprising the steps of:

(a) providing a power switching means in electrical series connection with the load and the source;

(b) detecting each zero crossing of the A.C. signal waveform of the source to provide a first signal;

(c) enabling the power stitching means to a turned-on condition to cause a flow of current through the load commencing substantially at each zero crossing and responsive to each occurrence of the first signal;

(d) disabling the power switching means to a turned-off condition to terminate the flow of current through the load from the source at the end of a selected time interval after the occurrence of each first signal and prior to the occurrence of a next subsequent first signal; and (e) selecting the time interval, between each repetition of steps (c) and (d), in each A.C. source signal waveform half-cycle, during which the power switching means conducts current to establish the desired conduction angle of current flowing through the load.

6. The method of claim 5, wherein each occurrence of disabling step (d) includes the step of: gradually, but completely, decreasing the flow of current through the power switching means at a predetermined rate, less than the fastest rate at which current flowing through the power switching means can be terminated, but sufficiently fast to terminate each interval of load current flow in less than one-half cycle of the A.C. source signal waveform.

7. The method of claim 5, further comprising the steps of: (f) establishing a maximum instantaneous load current of magnitude greater than the average load current magnitude; (g) non-magnetically nomitoring the instantaneous load current magnitude; and (h) disabling current conduction through the power switching means by step (d) if the monitored instantaneous load current exceeds the predetermined maximum instantaneous current.

8. The method of claim 7, wherein the resistance of the load increases with time after each initial connection of the load to the source; and further comprising the steps of: increasing the time interval during which the power switching means is conducting during each source waveform voltage half-cycle, by disabling current flow responsive only to step (h), if step (h) occurs before step (e); and terminating the power switching means current conduction at the end of the selected conduction time interval of step (e), to establish the average load current magnitude, after the load resistance has reached a predetermined level and step (h) ceases to occur before step (d).

9. A reverse-phase-control power switching circuit for controlling the magnitude of current current flow through a load from an A.C. source, comprising:

power switching means, having an input and a controlled-conduction circuit in electrical series connection with said load and said source, for enabling a flow of current through said load responsive to a first condition at said input, and for disabling current flow through said load responsive to a second condition at said input;

detector means for providing a first signal responsive to each zero crossing of the A.C. signal waveform of said source;

monitor means for non-magnetically generating a second signal when a monitored characteristic of said power switching means, related to the instantaneous magnitude of load current flowing therethrough, exceeds a reference value; and drive switch means, receiving said first and second signals, for providing said first condition at said power switching means input substantially upon receipt of said first signal and for providing said second condition at said power switching means input responsive to the first occurring one of (a) said second signal and (b) the elapsation of a preselected time interval after the occurrence of each first signal and prior to the occurrence of the next-subsequent first signal.

10. The circuit of claim 9, further comprising means, connected between said drive switch means and said power switching means input, for modifying the second condition at said power switching means input for relatively gradually decreasing, in substantially less than one-half cycle of the A.C. source signal waveform, the flow of current through said power switching means, responsive to said drive switch means providing said second condition.

11. The circuit of claim 10, wherein said drive switch means comprises: a source of operating potential; a timing subcircuit having first and second inputs respectively receiving the associated one of said first and second signals, a threshold input, a discharge terminal enabled to a high-impedance condition responsive to enablement of said first input and enabled to a low-impedance condition responsive to enablement of one of said second and threshold inputs, and an output enabled to a first level responsive to enablement of said first input and enabled to a second level, different from said first level, responsive to the first occurring one of the enablement of said second and threshold inputs; timing circuit means, coupled between said operating potential source, a common circuit potential, said threshold input and said discharge terminal, for providing an enabling voltage at said threshold input at said preselected time interval after the occurrence of the high-impedance condition at said discharge terminal, and also for providing a voltage at said threshold terminal at a value less than the enabling threshold input voltage responsive to enablement of the discharge terminal to said low-impedance condition; and drive turn-on means, coupled between said timing subcircuit output and said power switching means input, for providing said first condition at said power switching means input responsive to said timing subcircuit output being at said first level.

12. The circuit of claim 11, wherein said drive turn-on means comprises a unidirectionally-conducting device poled to conduct only when said timing subcircuit output is at said first level.

13. The circuit of claim 11, wherein said drive turn-on means comprises switching means, having a controlling input connected to said timing subcircuit output, for coupling said operating potential source to said power switching means input only while said timing subcircuit output is at said first level.

14. The circuit of claim 9, wherein said power switching means comprises a pair of power switching devices, each having an input and a controlled-conduction circuit through which a unidirectional current flow is controlled by the condition of a signal at said input; the controlled-conduction circuits of said pair of devices being connected, for opposite directions of current flow, in series each with the other and also between said source and said load; the inputs of both power switching devices being connected in parallel to said power switching means input; and a pair of unidirectionally-conducting devices, each connected in parallel with the controlled-conduction circuit of an associated one of said power switching devices and poled to conduct only in the opposite direction of current flow with respect to the unidirectional flow of current through the associated switching device; the common junction between the controlled-conduction circuits of both power switching devices and both unidirectionally-conducting devices being connected to a circuit common potential.

15. The circuit of claim 14, wherein said power switching devices are power field-effect transistors.

16. The circuit of claim 14, wherein said power switching devices are insulated gate transistors.

17. The circuit of claim 14, wherein each unidirectionally-conducting device is a diode parasitically formed across the controlled-conduction circuit of the associated power switching device.

18. The circuit of claim 9, wherein said detector, monitor and drive switch means are substantially contained within a single integrated circuit.

19. The circuit of claim 9, wherein said detector means is a zero-crossing detector subcircuit providing said first signal as a pulse signal responsive to each A.C. source signal waveform zero crossing.

20. The circuit of claim 9, wherein said monitor means comprises: means for non-magnetically monitoring said power switching means characteristic to provide a voltage related to the instantaneous magnitude of load current flowing therethrough; means for generating a reference voltage of magnitude related to said reference value; and means for comparing said monitor and reference voltages to generate said second signal when said monitor voltage exceeds said reference voltage.

21. The circuit of claim 20, wherein said reference voltage providing means includes means for adjusting the reference voltage magnitude to a value greater than the magnitude of the monitor voltage expected for the desired current flow through said load.

22. The circuit of claim 21, wherein said drive switch means includes means for varying the preselected time interval, to vary the load current flow magnitude; and wherein said reference-voltage-adjusting means is operatively coupled to said time-interval-varying means to maintain said reference voltage at a magnitude consistent with a monitor voltage magnitude responsive to a current flow greater than the normal load current flow set by the present setting of said time-interval-varying means.

23. The circuit of claim 20, wherein said monitoring means includes: a resistive voltage divider having input terminals connected across the controlled-conduction circuit of said power switching means and having an output junction at which said monitor voltage is provided.

24. The circuit of claim 20, wherein said comparator means includes: a pair of comparators each having a first input receiving said reference voltage, a second input, and an output changing state responsive to the voltage at said second input exceeding the reference voltage at said first input; the second input of each comparator being connected to one different one of the ends of the controlled-conduction circuit of said power switching means; and means receiving the output of each of said pair of comparators for providing said second signal upon the change of state of either comparator.

* * * * *